Jan. 2, 1968   E. I. DRUCKMAN   3,361,018
SPRING MOUNTED TOOL HOLDER
Filed Oct. 8, 1965

INVENTOR.
BY ELIHU I. DRUCKMAN
*Elliott & Pastoriza*
ATTORNEYS

United States Patent Office 3,361,018
Patented Jan. 2, 1968

3,361,018
SPRING MOUNTED TOOL HOLDER
Elihu I. Druckman, 28907 Grayfox St.,
Malibu, Calif. 90265
Filed Oct. 8, 1965, Ser. No. 494,050
2 Claims. (Cl. 82—24)

ABSTRACT OF THE DISCLOSURE

This disclosure relates to a tool holder for lathes in the form of a pair of flat parallel leaf springs having their lower ends secured to the lathe and their upper ends mounting a tool holder. The arrangement is such that the tool holder may flex towards and away from a rotating work piece on the lathe, the leaf springs constraining movement to this direction. A tool is secured in the holder and may be urged towards the work against the bias or flexing of the springs by a suitable cam arrangement or by any other means, the leaf springs serving to guide the tool in the constrained direction.

---

This invention relates generally to tool holders and more particularly to a novel means for mounting a tool holder on the bed of a lathe or the like.

Lathes as presently constructed are usually provided with tool holders which are slideable toward and away from the workpiece by means of a dovetail tongue and groove engagement with the bed of the lathe. This arrangement requires adjustment from time to time as a result of friction causing wear between the engaged portions of the tool holder and lathe bed. If, for example, successive cutting operations to uniform depths are to be carried out, such friction and wear results in a cumulative error on each successive cut to a point at which required tolerances are no longer maintained.

Further error can also result in the event the tool is not moved out of contact with the workpiece after a cut of predetermined dimensions has been made.

Although the invention will be described with reference to a lathe, it will be appreciable that the present tool holder improvement is equally adaptable to other equivalent machine tools.

Wit hthe foregoing in mind, it is a primary object of this invention to provide a novel means for mounting a tool holder on a lathe such that the associated tool may be repeatedly moved into and out of engagement with a rotating workpiece without the occurrence of friction and wear between the tool holder and the lathe, thereby permitting uniformly accurate cuts to be made.

Another object is to provide a novel means for mounting a tool holder on a lathe which insures that the associated cutting tool will be automatically moved out of engagement with the workpiece after the desired cut has been made.

Another object is to provide an improved tool holder of a construction such that a plurality thereof may be simply mounted and actuated from a single cam shaft with several cams.

Another object is to provide a novel mounting means for a cutting tool which permits the speed of operation to be increased without a loss in accuracy.

Other objects are to provide an improved means for mounting a tool holder which is simple in construction and may be manufactured economically.

Briefly, these and many other objects and advantages of this invention are attained by providing a mounting means for a tool holder which preferably includes a pair of spaced flat spring members securely attached to the bed of the lathe or other supporting member. Secured to the top portions of the spring members is a tool holder and an associated cutting tool. The foregoing structure is designed such that the tool holder and associated cutting tool are movable toward and away from a rotating workpiece.

The means for causing the cutting tool to be movable toward and away from the workpiece may, in one embodiment, comprise an eccentrically mounted rotatable cam wheel. The cam wheel is positioned to engage a portion of the tool holder opposite to the end upon which the cutting tool is mounted, whereby when the cam wheel is rotated the cutting tool will be moved toward and away from the workpiece.

The tool holder may be provided with an adjustable means whereby the extent of travel of the tool holder may be properly selected.

A better understanding of the invention will now be had by referring to a preferred embodiment thereof as shown in the accompanying drawings, in which.

Figure 1:
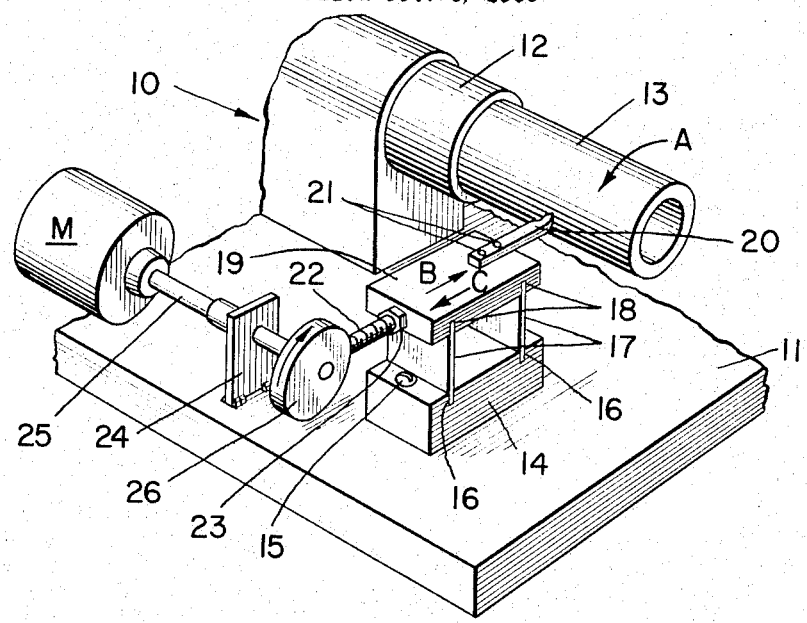
FIGURE 1 is a fragmentary perspective view of a power driven lathe incorporating the novel mounting and driving means for a tool in accordance with the invention.

Referring first to FIGURE 1, there is shown a portion 10 of a power driven lathe secured to a lathe bed 11. The portion 10 rotatably mounts a lathe chuck 12 for rotating a workpiece 13 all in a conventional manner.

The mounting means of the present invention includes a base block 14 securely held to the lathe bed 11 as by bolts 15. As shown, the base block is provided with a pair of slots 16 cut into its top surface and running parallel to each other and to the axis of rotation of the workpiece 13. These slots 16 receive and support the lower ends of upwardly extending flat spring members 17, the upper ends of which are secured within slots 18 cut in the under side of a tool holder 19. The flat spring members 17 are held in spaced relationship with each other and in parallel relationship with the axis of rotation of the workpiece; thus, the spring members 17 are arranged to be relatively rigid in all directions except in a direction toward and away from the workpiece. Thus, the tool holder 19 is constrained by the springs to movement toward and away from the workpiece in a direction generally normal to the axis of rotation of the workpiece.

The tool holder 19 carries a cutting tool 20 at one end which may be secured thereto by means of screws 21. The opposite end of the tool holder 19 is provided with an adjustable threaded pin 22 adapted to be locked in a desired threaded position to the tool holder 19 by means of a lock nut 23.

To control movement of the tool holder toward and away from the workpiece, there is shown illustratively a driving means including a bearing assembly 24 secured to the lathe bed 11 and journaling a shaft 25, in turn terminating in an eccentrically mounted cam wheel 26. The cam wheel 26 is positioned to engage the free end of the adjustable pin 22 as shown.

In operation and with reference first to FIGURE 1, the shaft 25 is rotated by a suitable power source, e.g., a motor M, to rotate the cam wheel 26 such as, for example, in the direction of arrow A. Since the cam wheel 26 is eccentrically mounted on the shaft 25, the "throw" of the cam wheel acting on the pin 22 moves the tool holder 19 and tool 20 toward the workpiece in the direction of arrow B. This motion is opposed by the flexing of the springs 17 so that the tool holder and tool will move back or away from the workpiece in the direction of arrow C automatically when the cam wheel is rotated back to its original position.

Figure 2:
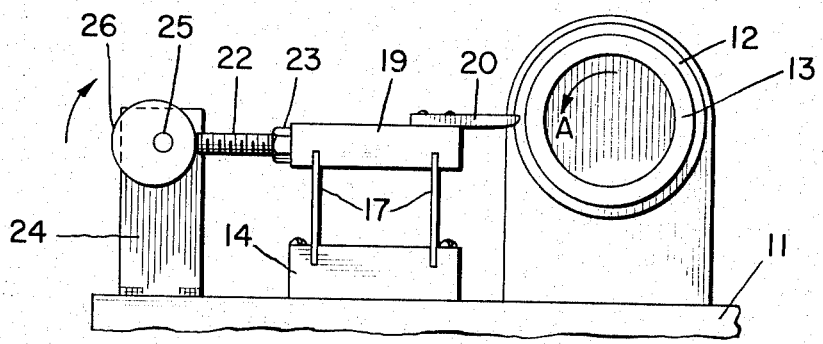
FIGURE 2 is a side view of the mounting means in a position prior to a cut being made.
Figure 3:
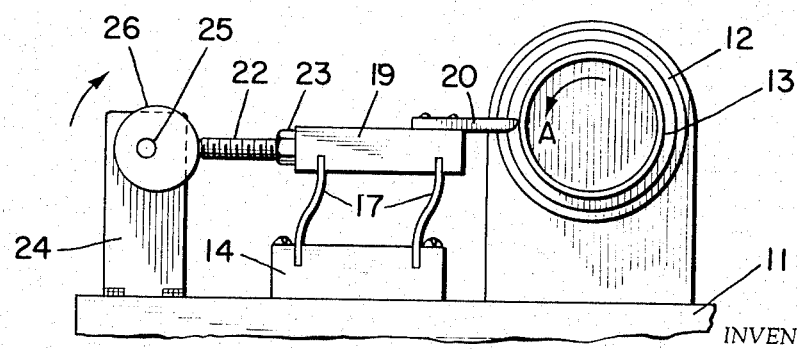
FIGURE 3 is a side view of the mounting means in a position in which a tool is making a cut into the rotating workpiece.

More particularly, and with specific reference to FIGURE 2, the tool 20 will be out of engagement with the workpiece 13 when the spring members 17 are in an unflexed or normal position as shown. This position is assured when the cam wheel 26 is positioned with the peripheral portion defining its minimum radius engaging the pin 22. When the cam wheel is rotated from the position shown in FIGURE 2 to the position shown in FIGURE 3, the tool 20 will make a cut into the workpiece 13, the spring members 17 flexing in the manner shown to oppose this movement.

Thus, it is apparent that if the cam wheel is rotated through a complete revolution, the tool 20 is automatically moved into and out of engagement with the workpiece 13 to effect a cut of given depth. To adjust the depth of the cut, the lock nut 23 may be loosened, the pin 22 turned clockwise or counterclockwise to vary its effective length, and the lock nut 23 then tightened against the end of the tool holder 19 to lock the pin 22 in the desired position.

From the foregoing description, it is apparent that this invention provides a novel mounting and driving means for a tool holder which eliminates friction and wear in the movement of the tool holder toward and away from the workpiece. The absence of backlash in this movement enables the lathe to perform successive high speed cutting operations with no loss in accuracy.

Various changes falling within the scope and spirit of this invention will occur to those skilled in the art. The mounting and driving means is therefore not to be thought of as limited to the specific embodiment set forth.

What is claimed is:

1. A spring-mounted tool holder comprising, in combination: a pair of identical flat parallel leaf springs in spaced vertical planes adapted to be mounted on a lathe with their lower ends fixed relative to said lathe and their upper ends free of said lathe; and a tool holder secured to said upper ends of said springs such that said tool holder is constrained to move in a direction normal to the planes of said springs upon flexure of said springs in response to a force applied to said tool holder to move said tool holder towards a rotating work piece on said lathe.

2. A spring-mounted tool holder for mounting a cutting tool adjacent to a lathe-mounted rotating workpiece, comprising: a pair of spaced flat parallel spring members vertically mounted on said lathe with their lower ends fixed relative to said lathe; a tool holder mounted on the upper ends of said spring members and being adapted to receive said cutting tool thereon; and a rotatable cam mounted on said lathe, said tool holder further including an adjustable pin positioned to engage said cam whereby said tool holder is movable toward and away from said workpiece in response to rotation of said cam and flexure of said spring members.

References Cited

UNITED STATES PATENTS

| | | | |
|---|---|---|---|
| 1,132,920 | 3/1915 | Fay | 82—19 XR |
| 2,377,239 | 5/1945 | Kasen | 82—19 |
| 3,057,235 | 10/1962 | Mey | 82—19 |

LEONIDAS VLACHOS, *Primary Examiner.*